US006723402B2

(12) United States Patent
Nair et al.

(10) Patent No.: US 6,723,402 B2
(45) Date of Patent: *Apr. 20, 2004

(54) PROTECTIVE LAYER FOR HYDROPHILIC PACKAGING MATERIAL

(75) Inventors: Mridula Nair, Penfield, NY (US); William T. Rochford, Rochester, NY (US); Kenneth W. Best, Jr., Rochester, NY (US); Robert P. Bourdelais, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/027,974

(22) Filed: Dec. 21, 2001

(65) Prior Publication Data

US 2003/0124452 A1 Jul. 3, 2003

(51) Int. Cl.$^7$ .......... B29D 22/00

(52) U.S. Cl. .......... 428/35.7; 428/39.8; 428/35.9; 430/217

(58) Field of Search .......... 428/35.7, 35.9, 428/35.8; 430/217

(56) References Cited

U.S. PATENT DOCUMENTS

| | | | | | |
|---|---|---|---|---|---|
| 2,173,480 | A | | 9/1939 | Jung | |
| 2,259,009 | A | | 10/1941 | Talbot | |
| 2,331,746 | A | | 10/1943 | Talbot | |
| 2,798,004 | A | | 7/1957 | Weigel | |
| 3,113,867 | A | | 12/1963 | Van Norman et al. | |
| 3,190,197 | A | | 6/1965 | Pinder | |
| 3,397,980 | A | | 8/1968 | Stone | |
| 3,415,670 | A | | 12/1968 | McDonald | |
| 3,443,946 | A | | 5/1969 | Grabhofer et al. | |
| 3,697,277 | A | | 10/1972 | King | |
| 3,733,293 | A | | 5/1973 | Gallagher et al. | |
| 4,001,023 | A | * | 1/1977 | Van Paesschen et al. | 430/529 |
| 4,092,173 | A | | 5/1978 | Novak et al. | |
| 4,171,979 | A | | 10/1979 | Novak et al. | |
| 4,333,998 | A | | 6/1982 | Leszyk | |
| 4,426,431 | A | | 1/1984 | Harasta et al. | |
| 4,687,692 | A | * | 8/1987 | Akao | 428/137 |
| 4,999,266 | A | | 3/1991 | Platzer et al. | |
| 5,376,434 | A | | 12/1994 | Ogawa et al. | |
| 5,447,832 | A | | 9/1995 | Wang et al. | |
| 5,639,589 | A | * | 6/1997 | Bauer et al. | 430/532 |
| 5,966,150 | A | * | 10/1999 | Lester et al. | 347/43 |
| 6,465,165 | B2 | * | 10/2002 | Landry-Coltrain et al. | 430/523 |
| 6,472,034 | B1 | * | 10/2002 | Bourdelais et al. | 428/35.7 |
| 6,556,024 | B2 | * | 4/2003 | Sasaki et al. | 324/660 |

FOREIGN PATENT DOCUMENTS

| | | |
|---|---|---|
| EP | 0 994 385 | 4/2000 |
| EP | 1089126 | 4/2001 |
| EP | 1 089 127 | 4/2001 |
| EP | 1052541 | 12/2002 |

* cited by examiner

*Primary Examiner*—Cynthia H. Kelly
*Assistant Examiner*—Tamra Dicus
(74) *Attorney, Agent, or Firm*—Paul A. Leipold

(57) ABSTRACT

The invention relates to a packaging material comprising in order a ultraviolet radiation cured environmental protection layer, a primer layer, a hydrophilic image layer, a base and an adhesive layer.

13 Claims, No Drawings

PROTECTIVE LAYER FOR HYDROPHILIC PACKAGING MATERIAL

FIELD OF THE INVENTION

The invention relates to environmental protection for packaging materials. In a preferred form it relates to the use of silver halide pressure sensitive label for the printing of text, graphics and images applied to packaging material having a moisture resistant protective overcoat, that also resists fingerprints and scratches.

BACKGROUND OF THE INVENTION

Pressure sensitive labels are applied to packages to build brand awareness, describe the contents of the package, convey a quality message regarding the contents of a package and supply consumer information such as directions on product use, or an ingredient listing of the contents. Printing on the pressure sensitive label is typically done using gravure printing or flexography is applied to the package. The three types of information applied to a pressure sensitive label are text, graphic and images. Some packages only require one type of information while other packages require more than one type of information.

Prior art labels that are applied to packages consist of a face stock material, a pressure sensitive adhesive and a liner. The label substrate consisting of the face stock, pressure sensitive adhesive and liner are typically laminated and then printed utilizing a variety of non-photographic printing methods. After printing, the labels are generally protected by an over laminate material or a protective coating. The completed label consisting of a protection layer, printed information, face stock, pressure sensitive adhesive is applied to packages utilizing high speed labeling equipment.

Flexography is an offset letterpress technique where the printing plates are made from rubber or photopolymers. The printing on pressure sensitive label is accomplished by the transfer of ink from the raised surface of the printing plate to the surface of the material being printed. The rotogravure method of printing uses a print cylinder with thousands of tiny cells which are below the surface of the printing cylinder. The ink is transferred from the cells when the print cylinder is brought into contact with the pressure sensitive label at the impression roll. Printing inks for flexography or rotogravure include solvent based inks, water based inks and radiation cured inks. While rotogravure and flexography printing do provide acceptable image quality, these two printing methods require expensive and time consuming preparation of print cylinders or printing plates which make printing jobs of less than 100,000 units expensive as the set up cost and the cost of the cylinders or printing plates is typically depreciated over the size of the print job.

Recently, digital printing has become a viable method for the printing of information on packages. The term digital printing refers to the electronic digital characters or electronic digital images that can be printed by an electronic output device capable of translating digital information. The two main digital printing technologies are ink jet and electrophotography.

The introduction of piezo impulse drop-on-demand (DOD) and thermal DOD ink jet printers in the early 1980's provided ink jet printing systems. These early printers were very slow, and the ink jet nozzles often clogged. In the 1990's Hewlett Packard introduced the first monochrome ink jet printer, and, shortly thereafter, the introduction of color, wide format ink jet printers enabled businesses to enter the graphic arts market. Today, a number of different ink jet technologies are being used for packaging, desktop, industrial, commercial, photographic, and textile applications.

In piezo technology, a piezo crystal is electrically stimulated to create pressure waves, which eject ink from the ink chamber. The ink can be electrically charged and deflected in a potential field, allowing the different characters to be created. More recent developments have introduced DOD multiple jets that utilize conductive piezo ceramic material, which, when charged, increases the pressure in the channel and forces a drop of ink from the end of the nozzle. This allows for very small droplets of ink to form and be delivered at high speed at very high resolution, approximately 1,000 dpi printing.

Until recently, the use of color pigments in jet inks was uncommon. However, this is changing rapidly. Submicron pigments were developed in Japan for ink jet applications. Use of pigments allows for more temperature resistant inks required for thermal ink jet printers and laminations. Pigmented water-based jet inks are commercially available, and UV-curable jet inks are in development. Pigmented inks have greater lightfastness and water-resistance.

Digital ink jet printing has the potential to revolutionize the printing industry by making short-run, color print jobs more economical. However, the next commercial stage will require significant improvements in ink jet technology; the major hurdle remaining is to improve print speed. Part of this problem is the limitation of the amount of data the printer can handle rapidly. The more complex the design, the slower the printing process. Right now they are about 10 times slower than comparable digital electrostatic printers.

Electrophotography was invented in the 1930's by Chester Carlson. By the early 1970's, the development of an electrophotographic color copier was being investigated by many companies. The technology for producing color copiers was already in place, but the market was not. It would take many more years until customer demand for color copies would create the necessary incentive to develop suitable electrostatic color copiers. By the late 1970's a few companies were using fax machines that could scan a document, reduce the images to electronic signals, send them out over the telephone wire, and, using another fax machine, retrieve the electronic signals and print the original image using heat-sensitive papers to produce a printed copy.

In 1993 Indigo and Xeikon introduced commercial digital printing machines targeted on short-run markets that were dominated by sheet-fed lithographic printers. Elimination of intermediate steps associated with negatives and plates used in offset printing provides faster turnaround and better customer service. These digital presses share some of the characteristics of traditional xerography but use very specialized inks. Unlike inks for conventional photocopiers, these inks are made with very small particle size components in the range of 1 $\mu$m. Dry toners used in xerography are typically 8–10 $\mu$m in size.

In 1995 Indigo introduced the Ominus press designed for printing flexible packaging products. The Ominus uses a digital offset color process called One Shot Color that has six colors. A key improvement has been the use of a special white Electro ink for transparent substrates. The Ominus web-fed digital printing system allows printing of various substrates using an offset cylinder that transfers the color image to the substrate. In principle, this allows perfect register regardless of the substrate being printed; paper, film, and metal can be printed by this process. This digital printing system is based on an electrophotographic process where the electrostatic image is created on the surface of a photoconductor by first charging the photo-conductor by charge corona and exposing the photoconductive surface to a light source in image fashion.

The charged electrostatic latent image is then developed using ink containing an opposite charge to that on the image. This part of the process is similar to that of electrostatic toners associated with photo-copying machines. The latent charged electrostatic image formed on the photoconductor surface is developed by means of electrophoretic transfer of the liquid toner. This electrostatic toner image is then transferred to a hot blanket, which coalesces the toner and maintains it in a tacky state until it is transferred to the substrate, which cools the ink and produces a tack-free print.

Electro inks typically comprise mineral oil and volatile organic compounds below that of conventional offset printing inks. They are designed so that the thermoplastic resin will fuse at elevated temperatures. In the actual printing process, the resin coalesced, the inks are transferred to the substrate, and there is no need to heat the ink to dry it. The ink is deposited on the substrate essentially dry, although it becomes tack-free as it cools and reaches room temperature.

For several decades a magnetic digital technology called "magnetography" has been under development. This process involves creating electrical images on a magnetic cylinder and using magnetic toners as inks to create the image. The potential advantage of this technology lies in its high press speed. Tests have shown speeds of 200 meters per minute. Although these magnetic digital printers are limited to black and white copy, developments of color magnetic inks would make this high-speed digital technology economically feasible. The key to its growth will be further development of the VHSM (very high speed magnetic) drum and the color magnetic inks.

Within the magnetic digital arena, a hybrid system called magnetolithography has been built and tested on narrow web and short-run applications developed by Nipson Printing Systems in Belfort, France. The technology appears to provide high resolution, and tests have been conducted using a silicon-based, high density, magnetographic head. Much more work is necessary in the ink development to bring this system to a competitive position relative to ink jet or electrophotography. However, the fact that it has high speed printing potential makes it an attractive alternate for packaging applications in which today's ink jet and electrophotography technologies are lagging.

Photographic materials have been known for use as prints for preserving memories for special events such as birthdays and vacations. They also have been utilized for large display materials utilized in advertising. These materials have been known as high quality products that are costly and somewhat fragile as they would be easily defaced by fingerprints, abrasion, water, or bending. Photographs are traditionally placed in frames, photo albums, and behind protective materials in view of their fragile nature, as well as their value. They are considered luxury items for the consumers to preserve a record of important events in their lives. They also have been considered as expensive display materials for advertising. In view of their status as luxury items, they have not been utilized in other areas of commerce.

Silver-halide photographic elements contain light sensitive silver halide in a hydrophilic emulsion. An image is formed in the element by exposing the silver halide to light, or to other actinic radiation, and developing the exposed silver halide to reduce it to elemental silver.

In color photographic elements, a dye image is formed as a consequence of silver halide development by one of several different processes. The most common is to allow a by-product of silver-halide development, oxidized silver-halide developing agent, to react with a compound called a coupler to form the dye image. The silver and unreacted silver halide are then removed from the photographic element, leaving a dye image.

In either case, formation of the image commonly involves liquid processing with aqueous solutions that must penetrate the surface of the element to come into contact with silver halide and coupler. Thus, gelatin and similar natural or synthetic hydrophilic polymers have proven to be the binders of choice for silver-halide photographic elements. Unfortunately, when gelatin or similar polymers are formulated so as to facilitate contact between the silver halide crystal and aqueous processing solutions, they are not as water, fingerprint and scratch resistant as would be desired for something that is intended to be handled in the way that a packaging label may be handled.

There have been attempts over the years to provide protective layers for gelatin-based image systems that will protect the images from damage by water or aqueous solutions. U.S. Pat. No. 2,173,480 describe a method of applying a colloidal suspension to moist film as the last step of photographic processing before drying. A number of patents describes methods of solvent coating a protective layer on the image after photographic processing is completed and are described, for example, in U.S. Pat. Nos. 2,259,009, 2,331,746, 2,798,004, 3,113,867, 3,190,197, 3,415,670 and 3,733,293. A drawback for the solvent coating method is the health and environmental concern of those chemicals to the coating operator. More recently, U.S. Pat. No. 5,376,434 describes a protective layer formed on a photographic print by coating and drying a latex on a gelatin-containing layer bearing an image. The latex is a resin having a glass transition temperature of from 30° C. to 70° C.

Various lamination techniques are known and practiced in the trade. U.S. Pat. Nos. 3,397,980, 3,697,277 and 4,999,266 describe methods of laminating a polymeric sheet film, as a protective layer, on a processed image.

U.S. Pat. No. 5,447,832 describes the use of a protective layer containing a mixture of high and low Tg latices as a water-resistant layer to preserve the antistat property of a $V_2O_5$ layer through photographic processing. This protective layer however, was not applied over the image formation layers. U.S. Pat. No. 3,443,946 provides a roughened (matte) scratch-protective layer, but not one designed to be water-impermeable or resistant.

Another type of protective coating involves the application of UV-polymerizable monomers and oligomers on a processed image followed by radiation exposure to form crosslinked protective layer, which is described in U.S. Pat. Nos. 4,092,173, 4,171,979, 4,333,998 and 4,426,431. While suitable for photographic pictures used in the conventional way these coatings do not exhibit the toughness over a range of environmental conditions and roughness in handling required of packaging materials. They will not maintain the coating integrity over the range of conditions encountered in packaging.

The advantage of a UV curable system is that most UV inks and coatings are 100% solids and has no volatiles or flammable solvents. The chemical components used in UV curing systems react rapidly upon exposure to UV light allowing for high throughput. The process is more energy efficient than conventional drying processes. Water and solvent inks and coatings require more energy to evaporate the carrier during drying. The curing equipment is relatively compact and can be mounted in tight spaces on printing and coating equipment. Since UV products don't evaporate, they do not dry on printing equipment and are easy to clean up. The cured coatings provide very good gloss in addition to good resistance to water and abrasion. A disadvantage of gelatin, the binder for photographic and ink jet elements and other image systems is that it is hydrophilic and not easily wetted by organophilic compounds such as UV curable monomers and oligomers. Further for the same reason it is not easy to obtain adequate adhesion of the UV cured overcoat to the image bearing hydrophilic layer. While the prior art claims good adhesion of the UV cured overcoat to the imaged gelatin layer there is no experimental evidence that substantiates these claims. Hence there exists a need for a moisture resistant UV cured overcoat as described in this invention that can be coated over a gelatin substrate that has good adhesion to the substrate.

SUMMARY OF THE INVENTION

An object of this invention is to overcome disadvantages of the prior art.

Another object is to provide labels with increased resistance to moisture.

Another object is to provide an overcoat with improved adhesion to the imaged substrate.

The present invention is directed to a packaging material comprising in order a ultraviolet radiation cured environmental protection layer, a primer layer, a hydrophilic image layer, a base and an adhesive layer.

DETAILED DESCRIPTION OF THE INVENTION

The invention has numerous advantages over prior practices in the art. The invention provides a printing method that is economically viable when printing short runs as the cost of printing plates or printing cylinders are avoided. The use of silver halide images for example, applied to a package ensures the highest image quality currently available compared to the common but lower quality six color rotogravure printed images. Further, because the yellow, magenta, and cyan layers contain gelatin interlayers, the silver halide images appear to have depth. Silver halide image layers have also been optimized to accurately replicate flesh tones, providing superior images of people compared to alternate prior art digital imaging technologies.

Silver halide image technology can simultaneously print text, graphics, and photographic quality images on the pressure sensitive label. Since the silver halide imaging layers of the invention are both optically and digitally compatible, text, graphics, and images can be printed using known digital printing equipment such as lasers and CRT printers. Because the silver halide system is digitally compatible, each package can contain different data thereby enabling customization of individual packages without the extra expense of printing plates or cylinders. Further, printing digital files allows the files to be transported using electronic data transfer technology such as the internet thus reducing the cycle time to apply printing to a package. Silver halide imaging layers can be digitally exposed with a laser or CRT at speeds greater than 75 meters per minute allowing competitive printing speeds compared to current ink jet or electrophotographic printing engines. These and other advantages will be apparent from the detailed description below.

The present invention provides a novel overcoat formulation to the emulsion side of photographic products, particularly silver halide based labels, which encounter frequent handling by end users. The present invention is also directed to providing environmental protection from moisture to the final label for flexible packaging material comprising a hydrophilic imaged layer. In accordance with this invention, an environmental protection layer is applied over the hydrophilic imaged layer of the imaging element after exposure and processing. The environmental protection layer is composed of an ultraviolet (UV) radiation cured polymeric layer coated over a primer layer and provides water-resistant coatings. It has been found that if the UV cured polymer is used alone without the primer layer, adhesion of the environmental protection layer to the hydrophilic imaging layer below is compromised.

UV curable compositions useful in the practice of this invention may be of two major types of curing chemistries, free radical chemistry and cationic chemistry. Acrylate monomers (reactive diluents) and oligomers (reactive resins) are the primary components of the free radical based formulations, giving the cured coating most of its physical characteristics. Photoinitiators are required to absorb the UV light energy, destabilize to form free radicals, and attack the acrylate group C═C double bond to initiate polymerization. Cationic chemistry utilizes cycloaliphatic epoxy resins and vinyl ether monomers as the primary components. Photoinitiators absorb the UV light to form a Lewis acid, which attacks the epoxy ring initiating polymerization.

The ultraviolet polymerizable monomers and oligomers are applied to the primer layer on the outermost layer of the developed silver halide imaging layers and subsequently exposed to UV radiation to form a thin cross-linked protective layer. The preferred UV cure absorbance energy is between 10 and 150 $mJ/cm^2$.

Some examples of UV curable systems used in the environmental protection layer of this invention that are commercially available are RD1020, and RD1200, both acrylate based monomers and oligomers from R&D Coatings, Inc., Radcure 504W and Radcure 159SLV, also acrylate based monomers and oligomers from Rad-Cure corporation, L533-119, from QureTech, and Imagegard FP-3/MF-1, an epoxy based overcoat composition from Dalcor Products Company, Inc.

In a particular embodiment, the environmental protection layer in the form of a continuous protective overcoat is applied over an imaged silver halide based label having at least one silver halide light-sensitive emulsion layer, and comprises an ultraviolet radiation cured environmental protection layer over a primer layer such that, it provides environmental protection of the imaged photographic element, adhesion to the imaged layer and excellent gloss characteristics. In accordance with a preferred form of the present invention, a packaging label comprises in order an upper environmental protection layer, an image preferably formed by means of silver halide, a base, an adhesive, a bottom peelable back wherein said environmental protection layer comprises an ultraviolet radiation cured environmental protection layer coated over a primer layer.

The overcoat layer in accordance with this invention is particularly advantageous due to superior physical properties including excellent resistance to water permeability, fingerprinting, fading and yellowing, exceptional transparency and toughness necessary for providing resistance to scratches, abrasion and blocking. It is preferred that the Rockwell R hardness of the ultraviolet radiation cured environmental protection layer be greater than 90, most preferably between 100 and 160. The Rockwell hardness test measures the hardness of the environmental protection layer by determining the plastic layer's resistance toward indentation. In the Rockwell method of hardness testing, the depth of penetration of an indenter (non-deformable ball or cone) under certain arbitrary test conditions is determined under a given load, within a specific period of time. The hardness testing of plastics is most commonly measured by the Rockwell hardness test.

The environmental protection layer should be clear, i.e., transparent, and is preferably colorless. But it is specifically contemplated that the environmental protection layer can have some color for the purposes of color correction, or for special effects, so long as it does not detrimentally affect the formation or viewing of the image through the overcoat. Thus, there can be incorporated into the polymer, dyes that will impart color. In addition, additives can be incorporated into the polymer that will give to the overcoat, desired properties. Other additional compounds may be added to the coating composition, depending on the functions of the particular layer, including surfactants, emulsifiers, coating aids, lubricants, matte particles, rheology modifiers, crosslinking agents, antifoggants, inorganic fillers such as conductive and nonconductive metal oxide particles, pigments, magnetic particles, biocide, and the like. The coating composition may also include a small amount of organic solvent, preferably the concentration of organic solvent is less than 1 percent by weight of the total coating composition.

The invention also contains a primer layer as described above. Such a layer improves the adhesion of the overcoat layer to the substrate below. Suitable primers include for example, a vinylidene chloride/methyl acrylate/itaconic acid terpolymer or vinylidene chloride/acrylonitrile/acrylic acid terpolymer as described in U.S. Pat. Nos. 2,627,088, 2,698,235, 2,698,240, 2,943,937, 3,143,421, 3,201,249, 3,271,178 and 3,501,301. The most preferred primer is the vinylidene chloride/methyl acrylate/itaconic acid terpolymer. The dry coverage of the primer is preferably greater than 0.27 $g/m^2$ and most preferably between 0.5 $g/m^2$ and 2 $g/m^2$.

Matte particles well known in the art may also be used in the coating composition of the invention, such matting agents have been described in *Research Disclosure* No. 308119, published December 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers.

In order to reduce the sliding friction of the photographic elements in accordance with this invention, the UV cured polymers may contain fluorinated or siloxane-based components and the coating composition may also include lubricants or combinations of lubricants. Typical lubricants include for example (1) liquid paraffin and paraffin or wax like materials such as carnauba wax, natural and synthetic waxes, petroleum waxes, mineral waxes and the like; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222, and 4,427,964, in British Patent Nos. 1,263,722; 1,198,387; 1,430,997; 1,466,304; 1,320,757; 1,320,565; and 1,320,756; and in German Patent Nos. 1,284,295 and 1,284,294; (3) perfluoro- or fluoro- or fluorochloro-containing materials, which include poly(tetrafluoroethylene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. However in order reduce to face-to-face stick-slip of the UV cured environmental protection layer bearing labels waxes such as carnauba wax or beeswax are preferred.

The primer layer and environmental protection layer of the invention can be applied by any of a number of well known techniques, such as dip coating, rod coating, blade coating, air knife coating, gravure coating and reverse roll coating, slot coating, extrusion coating, slide coating, curtain coating, and the like after printing and processing the label and before application to containers utilizing high speed labeling equipment. After coating, the layer is generally dried by simple evaporation, which may be accelerated by known techniques such as convection heating. Known coating and drying methods are described in further detail in Research Disclosure No. 308119, Published December 1989, pages 1007 to 1008. The preferred method of applying said environmental protective layer on said imaged support is by either direct or offset gravure coating since that is the label industry standard, and as such said product can be manufactured with minimal additional capital requirements, operational/process know-how, or alterations to industry standard practice. However, since the application here is of a continuous coating layer, it is required that the gravure cylinder have a continuous engraving on its surface rather than discrete patterns, which are more typical of printing applications. The preferred coating speed is at least 200 feet per minute.

It is suitable that the dry coating coverage of said environmental protective layer on said imaged support be at least 0.32 $g/m^2$ and less than 10.76 $g/m^2$ preferably 1.08 to 4.31 $g/m^2$ in order to ensure minimum curl and maximum environmental protection. It is also suggested that the coating be "cured" under ambient conditions for at least 24 hours after the coating process.

In the direct/offset gravure coating mode it is recommended that the environmental protective layer be coated at a viscosity between 20–50 centipoise in order to facilitate uniform-looking coatings without film-splitting and/or "orange-peel" patterned defects or "printing" of a discrete cell pattern. In direct/offset gravure coating, the desired dry coat weight, and the percent solids that gives the recommended viscosity together dictate the wet coating thickness, and hence the engraved volume of the anilox cylinder to be used. A typical range of engraved volumes is 0.3–2 $cc/ft^2$. An anilox cylinder, well know in the flexographic industry is the engraved steel roll with an overall pattern of cells which holds the coating solution and transfers it by contact and pressure to the surface of the label stock(direct gravure coating) or to the surface of an intermediate "offset" roll which in turn transfers the solution to the label stock(offset gravure coating).

In the event that said environmental protective layers need to be coated at viscosities of the order of a 1–10 centipoise, then it is recommended that they be coated in either the reverse gravure, reverse offset gravure, or wire-wound rod coating mode for most uniform coatings. The desired coating thickness can be chosen depending on required coating speed; and, in the case of wire-wound rod, ability of the "wire marks" to level themselves into a uniform coated layer. If the viscosity is 1–10 centipoise and direct gravure coating is the only available method, then, to avoid film-splitting defects, it is suggested that coating speeds be maintained low (below 80 fpm), and wet coverages be high (above 1.0 cc/$ft^2$); and in addition, ample UV light energy be provided in order to fully cure the coating.

In order to successfully transport materials of the invention, the reduction of static caused by web transport through manufacturing and image processing is desirable. Since the light sensitive imaging layers of this invention can be fogged by light from a static discharge accumulated by the web as it moves over conveyance equipment such as rollers and drive nips, the reduction of static is necessary to avoid undesirable static fog. The polymer substrate materials of this invention have a marked tendency to accumulate static charge as they contact machine components during transport. The use of an antistatic material to reduce the accumulated charge on the web materials of this invention is desirable.

Antistatic materials may be coated on the web materials of this invention and may contain any known materials in the art which can be coated on photographic web materials to reduce static during the transport of photographic paper. Examples of antistatic coatings include conductive salts and colloidal silica. Desirable antistatic properties of the support materials of this invention may also be accomplished by antistatic additives which are an integral part of the polymer layer. Incorporation of additives that migrate to the surface of the polymer to improve electrical conductivity include fatty quaternary ammonium compounds, fatty amines, and phosphate esters. Other types of antistatic additives are hygroscopic compounds such as polyethylene glycols and hydrophobic slip additives that reduce the coefficient of friction of the web materials. An antistatic coating applied to the opposite side from the image layer or incorporated into the support's backside polymer layer is preferred. The backside is preferred because the majority of the web contact during conveyance in manufacturing and photoprocessing is on the backside. The backside is the side not carrying the emulsion containing image forming layers. The preferred surface resistivity of the antistat coat at 50% RH is less than $10^{13}$ ohm/square. A surface resistivity of the antistat coat at 50% RH is less than $10^{13}$ ohm/square and has been shown to sufficiently reduce static fog in manufacturing and during photoprocessing of the image layers.

Conductive layers can be incorporated into multilayer imaging elements in any of various configurations depending upon the requirements of the specific imaging element. Preferably, the conductive layer is present as a subbing or tie layer underlying a magnetic recording layer on the side of the support opposite the imaging layer(s). However, conductive layers can be overcoated with layers other than a transparent magnetic recording layer (e.g., abrasion-resistant backing layer, curl control layer, pelloid, etc.) in order to minimize the increase in the resistivity of the conductive layer after overcoating. Further, additional conductive layers also can be provided on the same side of the support as the imaging layer(s) or on both sides of the support. An optional conductive subbing layer can be applied either underlying or overlying a gelatin subbing layer containing an antihalation dye or pigment. Alternatively, both antihalation and antistatic functions can be combined in a single layer containing conductive particles, antihalation dye, and a binder. Such a hybrid layer is typically coated on the same side of the support as the sensitized emulsion layer. Additional optional layers can be present as well. An additional conductive layer can be used as an outermost layer of an imaging element, for example, as a protective layer overlying an image-forming layer. When a conductive layer is applied over a sensitized emulsion layer, it is not necessary to apply any intermediate layers such as barrier or adhesion-promoting layers between the conductive overcoat layer and the imaging layer(s), although they can optionally be present. Other addenda, such as polymer latices to improve dimensional stability, hardeners or cross-linking agents, surfactants, matting agents, lubricants, and various other well-known additives can be present in any or all of the above mentioned layers.

Conductive layers underlying a transparent magnetic recording layer typically exhibit an internal resistivity of less than $1\times10^{10}$ ohms/square, preferably less than $1\times10^{9}$ ohms/square, and more preferably, less than $1\times10^{8}$ ohms/square.

The terms as used herein, "top", "upper", "emulsion side", and "face" mean the side or toward the side of a packaging material bearing the imaging layers. The term environmental protection layer means the layer applied over the imaging layers after image formation. The terms "face stock", "substrate" and "base" mean the material to which the hydrophilic imaging layers such as the silver halide layers are applied. The terms "bottom", "lower side", and "back" mean the side or toward the side of the label or packaging material opposite from the side bearing the images.

In order to produce a pressure sensitive photographic label, the liner material that carries the pressure sensitive adhesive, face stock and imaged layers, the liner material must allow for efficient transport in manufacturing, image printing, image development, label converting and label application equipment. A preferred label comprising a silver halide imaging layer, a base and a strippable liner adhesively connected by an adhesive to said base, wherein said base has a stiffness of between 15 and 60 millinewtons and an L* is greater than 92.0, and wherein said liner has a stiffness of between 40 and 120 millinewtons is preferred. The preferred photographic label packaging material is preferred with the white, stiff liner as it allows for efficient transport through photographic printing and processing equipment and improves printing speed compared to typical liner materials that are brown or clear and have little contribution to secondary exposure.

A peelable liner or back is preferred as the pressure sensitive adhesive required for adhesion of the label to the package, can not be transported through labeling equipment without the liner. The liner provides strength for conveyance and protects the pressure sensitive adhesive prior to application to the package. A preferred liner material is cellulose paper. A cellulose paper liner is flexible, strong and low in cost compared to polymer substrates. Further, a cellulose paper substrate allows for a textured label surface that can be desirable in some packaging applications. The paper may be provided with coatings that will provide waterproofing to the paper as the photographic element of the invention must be processed in aqueous chemistry to develop the image. An examples of a suitable water proof coatings applied to the paper are acrylic polymer, melt extruded polyethylene and oriented polyolefin sheets laminated to the paper. Paper is also preferred as paper can contain moisture and salt which provide antistatic properties that prevent static sensitization of the silver halide image layers.

Further, paper containing sizing agents, known in the photographic paper art and disclosed in U.S. Pat. No. 6,093,521, provide resistance to edge penetration of the silver halide image processing chemistry. An edge penetration of less than 8 micrometers is preferred as processing chemistry penetrated into the paper greater than 12 micrometers has been shown to swell causing die cutting problems when face stock matrix is die cut and stripped from the liner. Also, penetration of processing chemistry greater than 12 micrometers increases the chemistry usage in processing resulting in a higher processing costs.

Another preferred liner material or peelable back is an oriented sheet of polymer. The liner preferably is an oriented polymer because of the strength and toughness developed in the orientation process. Preferred polymers for the liner substrate include polyolefins, polyester and nylon. Preferred polyolefin polymers include polypropylene, polyethylene, polymethylpentene, polystyrene, polybutylene, and mixtures thereof. Polyolefin copolymers, including copolymers of propylene and ethylene such as hexene, butene, and octene are also useful. Polyester is most preferred, as it is has desirable strength and toughness properties required for efficient transport of silver halide pressure sensitive label liner in high speed labeling equipment.

In another preferred embodiment, the liner consists of a paper core to which sheets of oriented polymer are laminated. The laminated paper liner is preferred because the oriented sheets of polymer provide tensile strength which allows the thickness of the liner to be reduced compared to coated paper and the oriented polymer sheet provides resistance to curl during manufacturing and drying in the silver halide process.

The tensile strength of the liner or the tensile stress at which a substrate breaks apart is an important conveyance and forming parameter. Tensile strength is measured by ASTM D882 procedure. A tensile strength greater than 120 MPa is preferred as liners less than 110 MPa begin to fracture in automated packaging equipment during conveyance, forming and application to the package.

The coefficient of friction or COF of the liner bearing the silver halide imaging layer is an important characteristic as the COF is related to conveyance and forming efficiency in automated labeling equipment. COF is the ratio of the weight of an item moving on a surface to the force that maintains contact between the surface and the item. The mathematical expression for COF is as follows:

$$COF=\mu=(\text{friction force}/\text{normal force})$$

The COF of the liner is measured using ASTM D-1894 utilizing a stainless steel sled to measure both the static and dynamic COF of the liner. The preferred COF for the liner of the invention is between 0.2 and 0.6. As an example, a 0.2 COF is necessary for coating on a label used in a pick-and-place application. The operation using a mechanical device to pick a label and move it to another point requires a low COF so the label will easily slide over the surface of the label below it. At the other extreme, large sheets such as book covers require a 0.6 COF to prevent them from slipping and sliding when they are piled on top of each other in storage. Occasionally, a particular material may require a high COF on one side and a low COF on the other side. Normally, the base material itself, such as a plastic film, foil, or paper substrate, would provide the necessary COF for one side. Application of an appropriate coating would modify the image side to give the higher or lower value. Conceivably, two different coatings could be used with one on either side. COF can be static or kinetic. The coefficient of static friction is the value at the time movement between the two surfaces is ready to start but no actual movement has occurred. The coefficient of kinetic friction refers to the case when the two surfaces are actually sliding against each other at a constant rate of speed. COF is usually measured by using a sled placed on the surface. The force necessary at the onset of sliding provides a measurement of static COF. Pulling the sled at a constant speed over a given length provides a measure of kinetic frictional force.

The preferred thickness of the liner of the invention is between 75 and 225 micrometers. Thickness of the liner is important in that the strength of the liner, expressed in terms of tensile strength or mechanical modulus, must be balanced with the thickness of the liner to achieve a cost efficient design. For example, thick liners that are high in strength are not cost efficient because thick liners will result in short roll lengths compared to thin liners at a given roll diameter. A liner thickness less that 60 micrometers has been shown to cause transport failure in the edge guided silver halide printers. A liner thickness greater than 250 micrometers yields a design that is not cost effective and is difficult to transport in existing silver halide printers.

The liner of the invention preferably has an optical transmission of less than 20%. During the printing of the silver halide labels, exposure light energy is required to reflect from the face stock/liner combination to yield a secondary exposure. This secondary exposure is critical to maintaining high level of printing productivity. It has been shown that liners with an optical transmission of greater than 25% significantly reduces the printing speed of the silver halide label. Further, clear face stock material to provide the "no label look" need an opaque liner to not only maintain printing speed, but to prevent unwanted reflection from printing platens in current silver halide printers.

Since the light sensitive silver halide layers with expanded color gamut can suffer from unwanted exposure from static discharge during manufacturing, printing and processing, the liner preferably has a resistivity of less than $10^{11}$ ohms/square. A wide variety of electrically-conductive materials can be incorporated into antistatic layers to produce a wide range of conductivities. These can be divided into two broad groups: (i) ionic conductors and (ii) electronic conductors. In ionic conductors charge is transferred by the bulk diffusion of charged species through an electrolyte. Here the resistivity of the antistatic layer is dependent on temperature and humidity. Antistatic layers containing simple inorganic salts, alkali metal salts of surfactants, ionic conductive polymers, polymeric electrolytes containing alkali metal salts, and colloidal metal oxide sols (stabilized by metal salts), described previously in patent literature, fall in this category. However, many of the inorganic salts, polymeric electrolytes, and low molecular weight surfactants used are water-soluable and are leached out of the antistatic layers during processing, resulting in a loss of antistatic function. The conductivity of antistatic layers employing an electronic conductor depends on electronic mobility rather than ionic mobility and is independent of humidity. Antistatic layers which contain conjugated polymers, semiconductive metal halide salts, semiconductive metal oxide particles, etc. have been described previously. However, these antistatic layers typically contain a high volume percentage of electronically conducting materials which are often expensive and impart unfavorable physical characteristics, such as color, increased brittleness, and poor adhesion to the antistatic layer.

In a preferred embodiment of this invention the label has an antistat material incorporated into the liner or coated on the liner. It is desirable to have an antistat that has an electrical surface resistivity of at least $10^{11}$ log ohms/square. In the most preferred embodiment, the antistat material comprises at least one material selected from the group consisting of tin oxide and vanadium pentoxide.

In another preferred embodiment of the invention antistatic material are incorporated into the pressure sensitive adhesive layers. The antistatic material incorporated into the pressure sensitive adhesive layer provides static protection to the silver halide layers and reduces the static on the photographic label which has been shown to aid labeling of containers in high speed labeling equipment. As a standalone or supplement to the liner comprising an antistatic layer, the pressure sensitive adhesive may also further comprise an antistatic agent selected from the group consisting of conductive metal oxides, carbon particles, and synthetic smectite clay, or multi-layered with an inherently conductive polymer. In one of the preferred embodiments, the antistat material is metal oxides. Metal oxides are preferred because they are readily dispersed in the thermoplastic adhesive and can be applied to the polymer sheet by any means known in the art. Conductive metal oxides that may be useful in this invention are selected from the group consisting of conductive particles including doped-metal oxides, metal oxides containing oxygen deficiencies, metal antimonates, conductive nitrides, carbides, or borides, for example, $TiO_2$, $SnO_2$, $Al._2O_3$, $ZrO_3$, $In_2O_3$, MgO, $ZnSb_2O_6$, $InSbO_4$, $TiB_2$, $ZrB_2$, $NbB_2$, $TaB_2$, $CrB_2$, MoB, WB, $LaB_6$, ZrN, TiN, TiC, and WC. The most preferred materials are tin oxide and vanadium pentoxide because they provide excellent conductivity and are transparent.

The base material, or the flexible substrate utilized in this invention on to which the light sensitive silver halide imaging layers are applied, must not interfere with the silver halide imaging layers. Further, the base material of this invention needs to optimize the performance of the silver halide imaging system. Suitable flexible substrates must also perform efficiently in a automated packaging equipment for the application of photographic labels to various containers. A preferred flexible substrate is cellulose paper. A cellulose paper substrate is flexible, strong and low in cost compared to polymer substrates. Further, a cellulose paper substrate allows for a textured photographic label surface that can be desirable in some packaging applications. The paper may be provided with coatings that will provide waterproofing to the paper as the photographic element of the invention must be processed in aqueous chemistry to develop the silver halide image. An example of a suitable coating is acrylic or polyethylene polymer.

Polymer substrates are another preferred base material because they are tear resistant, have excellent conformability, good chemical resistance and are high in strength. Preferred polymer substrates include polyester, oriented polyolefin such as polyethylene and polypropylene, cast polyolefins such as polypropylene and polyethylene, polystyrene, acetate and vinyl. Polymers are preferred as they are strong and flexible and provide an excellent surface for the coating of silver halide imaging layers.

Biaxially oriented polyolefin sheets are preferred as they are low in cost, have excellent optical properties that optimize the silver halide system and can be applied to packages in high speed labeling equipment. Microvoided composite biaxially oriented sheets are most preferred because the voided layer provides opacity and lightness without the need for $TiO_2$. Also, the voided layers of the microvoided biaxially oriented sheets have been shown to significantly reduce pressure sensitivity of the silver halide imaging layers. Microvoided biaxially oriented sheets are conveniently manufactured by coextrusion of the core and surface layers, followed by biaxial orientation, whereby voids are formed around void-initiating material contained in the core layer. Such composite sheets are disclosed in U.S. Pat. Nos. 4,377,616; 4,758,462; 4,632,869 and 5,866,282. The biaxially oriented polyolefin sheets also may be laminated to one or both sides of a paper sheet to form a photographic label with greater stiffness if that is needed.

The flexible polymer base substrate may contain more than one layer. The skin layers of the flexible substrate can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

Voided biaxially oriented polyolefin sheets are a preferred flexible base substrate for the coating of light sensitive silver halide imaging layers. Voided films are preferred as they provide opacity, whiteness and image sharpness to the image. "Void" is used herein to mean devoid of added solid and liquid matter, although it is likely the "voids" contain gas. The void-initiating particles which remain in the finished packaging sheet core should be from 0.1 to 10 $\mu$m in diameter and preferably round in shape to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The photographic element of this invention generally has a glossy surface, that is, a surface that is sufficiently smooth to provide excellent reflection properties. An opalescent surface may be preferred because it provides a unique photographic appearance to a label that is perceptually preferred by consumers. The opalescent surface is achieved when the microvoids in the vertical direction are between 1 and 3 $\mu$m. By the vertical direction, it is meant the direction that is perpendicular to the plane of the imaging member. The thickness of the microvoids preferably is between 0.7 and 1.5 $\mu$m for best physical performance and opalescent properties. The preferred number of microvoids in the vertical direction is between 8 and 30. Less than 6 microvoids in the vertical direction do not create the desired opalescent surface. Greater than 35 microvoids in the vertical direction do not significantly improve the optical appearance of the opalescent surface.

The void-initiating material for the flexible base substrate may be selected from a variety of materials and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=$CH_2$, wherein Ar represents an aromatic hydrocarbon radical, or an aromatic halohydrocarbon radical of the benzene series and R is hydrogen or the methyl radical; acrylate-type monomers include monomers of the formula $CH_2$=C(R')=C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the cross-linked polymer void initiating particles include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly (methyl methacrylate). Most preferably, it is polystyrene, and the cross-linking agent is divinylbenzene.

Processes well known in the art yield nonuniformly sized void initiating particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, or calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

The total thickness of the topmost skin layer of the polymeric base substrate may be between 0.20 μm and 1.5 μm, preferably between 0.5 and 1.0 μm. Below 0.5 μm any inherent nonplanarity in the coextruded skin layer may result in unacceptable color variation. At skin thickness greater than 1.0 μm, there is a reduction in the photographic optical properties such as image resolution. At thickness greater than 1.0 μm, there is also a greater material volume to filter for contamination such as clumps or poor color pigment dispersion.

Addenda may be added to the top most skin layer of the flexible base substrate to change the color of the imaging element. For labeling use, a white substrate with a slight bluish tinge is preferred. The addition of the slight bluish tinge may be accomplished by any process which is known in the art including the machine blending of color concentrate prior to extrusion and the melt extrusion of blue colorants that have been preblended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, and Irgalite organic blue pigments. Optical brightener may also be added to the skin layer to absorb UV energy and emit light largely in the blue region. $TiO_2$ may also be added to the skin layer. While the addition of $TiO_2$ in the thin skin layer of this invention does not significantly contribute to the optical performance of the sheet, it can cause numerous manufacturing problems such as extrusion die lines and spots. The skin layer substantially free of $TiO_2$ is preferred. $TiO_2$ added to a layer between 0.20 and 1.5 μm does not substantially improve the optical properties of the support, will add cost to the design, and will cause objectionable pigments lines in the extrusion process.

Addenda may be added to the core matrix and/or to one or more skin layers to improve the optical properties of the flexible substrate. Titanium dioxide is preferred and is used in this invention to improve image sharpness or MTF, opacity, and whiteness. The $TiO_2$ used may be either anatase or rutile type. Further, both anatase and rutile $TiO_2$ may be blended to improve both whiteness and sharpness. Examples of $TiO_2$ that are acceptable for a photographic system are DuPont Chemical Co. R101 rutile $TiO_2$ and DuPont Chemical Co. R104 rutile $TiO_2$. Other pigments known in the art to improve photographic optical responses may also be used in this invention. Examples of other pigments known in the art to improve whiteness are talc, kaolin, $CaCO_3$, $BaSO_4$, ZnO, $TiO_2$, ZnS, and $MgCO_3$. The preferred $TiO_2$ type is anatase, as anatase $TiO_2$ has been found to optimize image whiteness and sharpness with a voided layer.

The voids provide added opacity to the flexible substrate. This voided layer can also be used in conjunction with a layer that contains at least one pigment from the group consisting of $TiO_2$, $CaCO_3$, clay, $BaSO_4$, ZnS, $MgCO_3$, talc, kaolin, or other materials that provide a highly reflective white layer in said film of more than one layer. The combination of a pigmented layer with a voided layer provides advantages in the optical performance of the final image.

The flexible biaxially base substrate of this invention which has a microvoided core is preferred. The microvoided core adds opacity and whiteness to the imaging support, further improving imaging quality. Combining the image quality advantages of a microvoided core with a material, which absorbs ultraviolet energy and emits light in the visible spectrum, allows for the unique optimization of image quality, as the image support can have a tint when exposed to ultraviolet energy yet retain excellent whiteness when the image is viewed using lighting that does not contain significant amounts of ultraviolet energy such as indoor lighting.

It has been found that the microvoids located in the voided layer of the flexible biaxially oriented substrate provide a reduction in undesirable pressure fog. Mechanical pressure, of the order of hundreds of kilograms per square centimeter, causes an undesirable, reversible decrease in sensitivity by a mechanism at the time of writing that is not fully understood. The net result of mechanical pressure is an unwanted increase in density, mainly yellow density. The voided layer in the biaxially oriented flexible substrate absorbs mechanical pressure by compression of the voided layer, common in the converting and photographic processing steps, and reduces the amount of yellow density change. Pressure sensitivity is measured by applying a 206 MPa load to the coated light sensitive silver halide emulsion, developing the yellow layer, and measuring the density difference with an X-Rite model 310 (or comparable) photographic transmission densitometer between the control sample which was unloaded and the loaded sample. The preferred change in yellow layer density is less than 0.02 at a pressure of 206 MPa. A 0.04 change in yellow density is perceptually significant and, thus, undesirable.

The coextrusion, quenching, orienting, and heat setting of the flexible base substrate may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers, while restraining to some degree the sheet against retraction in both directions of stretching.

By having at least one nonvoided skin on the microvoided core, the tensile strength of the flexible base substrate is increased and makes the sheet more manufacturable. The higher tensile strength also allows the sheets to be made at wider widths and higher draw ratios than when sheets are made with all layers voided. Coextruding the layers further simplifies the manufacturing process.

In order to provide a digital printing technology that can be applied to a package that is high in quality, can handle text, graphic and images, is economical for short run printing jobs and accurately reproduce flesh tones, silver halide imaging is preferred. The silver halide technology can be either black and white or color. The silver halide imaging layers are preferably exposed and developed prior to application to a package. The flexible substrate of the invention contains the necessary tensile strength properties and coefficient of friction properties to allow for efficient transport and application of the images in high speed labeling equipment. The substrate of the invention is formed by applying light sensitive silver halide imaging layers of a flexible label stock that contains a pressure sensitive adhesive. The imaging layers, face stock and pressure sensitive adhesive are supported and transported through labeling equipment using a tough liner material. Because the preferred light sensitive silver halide imaging layers are vulnerable to environmental solvents such as water and hand oils, the environmental protection layer of the invention is preferably applied to the light sensitive silver halide imaging layers after image development because the liquid processing chemistry required for image development must be able to efficiently penetrate the surface of the imaging layers to contact the silver halide and couplers utilizing typical silver halide imaging processes. The environmental protection layer would be generally impervious to developer chemistry.

While silver halide images are preferred for the above mentioned reasons, the environmental protection layer of the invention may also be utilized with other imaging materials such as ink jet, thermal, electrophotographic and the like. It particularly finds use with those materials that have a water soluble colloidal binder such as gelatin, polyvinyl alcohol etc.

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Inkjet printers have found broad applications across markets ranging from industrial labeling to short run printing to desktop document and pictorial imaging.

The inks used in the various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

An ink jet recording element typically comprises a support having on at least one surface thereof an ink-receiving or image-forming layer. The ink-receiving layer may be a polymer layer which swells to absorb the ink or a porous layer which imbibes the ink via capillary action.

Ink jet prints, prepared by printing onto ink jet recording elements, are subject to environmental degradation. They are especially vulnerable to water smearing, dye bleeding, coalescence and light fade. For example, since ink jet dyes are water-soluble, they can migrate from their location in the image layer when water comes in contact with the receiver after imaging. Highly swellable hydrophilic layers can take an undesirably long time to dry, slowing printing speed, and will dissolve when left in contact with water, destroying printed images. Porous layers speed the absorption of the ink vehicle, but often suffer from insufficient gloss and severe light fade.

A binder may also be employed in the image-receiving layer in the invention. In a preferred embodiment, the binder is a water soluble colloidal polymer. Examples of water soluble colloidal polymers useful in the invention include poly(vinyl alcohol), polyvinylpyrrolidone, poly(ethyl oxazoline), poly-N-vinylacetamide, non-deionized or deionized Type IV bone gelatin, acid processed ossein gelatin, pig skin gelatin, acetylated gelatin, phthalated gelatin, oxidized gelatin, chitosan, poly(alkylene oxide), sulfonated polyester, partially hydrolyzed poly(vinyl acetate-co-vinyl alcohol), poly(acrylic acid), poly(1-vinylpyrrolidone), poly(sodium styrene sulfonate), poly(2-acrylamido-2-methane sulfonic acid), polyacrylamide or mixtures thereof. In a preferred embodiment of the invention, the binder is gelatin or polyvinyl alcohol.

If a hydrophilic polymer is used in the image-receiving layer, it may be present in an amount of from about 0.02 to about 30 $g/m^2$, preferably from about 0.04 to about 16 $g/m^2$ of the image-receiving layer.

Latex polymer particles and/or inorganic oxide particles may also be used as the binder in the image-receiving layer to increase the porosity of the layer and improve the dry time. Preferably the latex polymer particles and/or inorganic oxide particles are cationic or neutral. Examples of inorganic oxide particles include barium sulfate, calcium carbonate, clay, silica or alumina, or mixtures thereof. In that case, the weight percent of particulates in the image receiving layer is from about 80 to about 95%, preferably from about 85 to about 90%.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A humectant is employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the invention is diethylene glycol, glycerol, or diethylene glycol monobutylether.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition employed in the invention to suppress the growth of microorganisms such as molds, fungi, etc. in aqueous inks. A preferred biocide for the ink composition employed in the present invention is Proxel® GXL (Zeneca Specialties Co.) at a final concentration of 0.0001–0.5 wt. %.

A typical ink composition employed with the invention material may comprise, for example, the following substituents by weight: colorant (0.05–5%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

The ink jet inks employed in this invention may be employed in ink jet printing wherein liquid ink drops are applied in a controlled fashion to an ink receptive layer substrate, by ejecting ink droplets from a plurality of nozzles or orifices of the print head of an ink jet printer.

The image-recording layer used in the process of the present invention can also contain various known additives, including matting agents such as titanium dioxide, zinc oxide, silica and polymeric beads such as crosslinked poly (methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV-absorbing agents; mildew-proofing agents; mordants; antistatic agents, anti-oxidants, optical brighteners, and the like. A hardener may also be added to the ink-receiving layer if desired.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 $\mu$m.

The ink jet image-recording layer may be present in any amount which is effective for the intended purpose. In general, good results are obtained when it is present in an amount of from about 2 to about 44 $g/m^2$, preferably from about 6 to about 32 $g/m^2$, which corresponds to a dry thickness of about 2 to about 40 $\mu$m, preferably about 6 to about 30 $\mu$m for good balance of ink absorption, dry time and material usage.

The following examples are used to illustrate the present invention. However, it should be understood that the invention is not limited to these illustrative examples.

The UV cureable compositions used in the environmental protection layers of the examples described herein were obtained commercially. RD1020, RD1200, RD 1220 and RD 707, all acrylate based monomers and oligomers were obtained from R&D Coatings, Inc., Radcure 504W and Radcure 159SLV, also acrylate based monomers and oligomers from Rad-Cure corporation, L533-119, from QureTech, and Imagegard FP-3/MF-1, an epoxy based overcoat composition from Dalcor Products Company, Inc. Beeswax was obtained from Aldrich and carnauba wax from Acros.

All the radiation curable environmental protection layers were coated over a silver halide imaged and processed label using the formulation and architecture described below.

A silver halide pressure sensitive packaging label was created by applying a light sensitive silver halide color imaging layers to a pressure sensitive label stock. The label stock consisted of a flexible white biaxially oriented polypropylene face stock coated with a pressure sensitive adhesive that was laminated to a high strength polyester liner. The light sensitive silver halide imaging layers were a yellow, magenta, and cyan coupler system capable of accurate reproduction of flesh tone. This label stock was imaged and processed prior to overcoating with the environmental protection layer.

Biaxially Oriented Polyolefin Face Stock

A composite sheet polyolefin sheet (31 μm thick) (d=0.68 g/cc) consisting of a microvoided and oriented polypropylene core (approximately 60% of the total sheet thickness), with a homopolymer non-microvoided oriented polypropylene layer on each side of the voided layer, the void initiating material used was poly(butylene terephthalate). The polyolefin sheet had a skin layer consisting of polyethylene and a blue pigment. The polypropylene layer adjacent the voided layer contained 4% rutile $TiO_2$ and optical brightener. The silver halide imaging layers were applied to the blue tinted polyethylene skin layer.

Pressure Sensitive Adhesive

Permanent water based acrylic adhesive 12 μm thick

Polyester Liner

A polyethylene terephthalate liner 37 μm thick that was transparent. The polyethylene terephthalate base had a stiffness of 15 millinewtons in the machine direction and 20 millinewtons in the cross direction.

Structure of the photographic packaging label material prior to adding the image layer of the example is as follows:

Voided polypropylene base

Acrylic pressure sensitive adhesive

Polyester liner

Silver chloride emulsions were chemically and spectrally sensitized as described below. A biocide comprising a mixture of N-methyl-isothiazolone and N-methyl-5-chloro-isthiazolone was added after sensitization.

Blue Sensitive Emulsion (Blue EM-1)

A high chloride silver halide emulsion is precipitated by adding approximately equimolar silver nitrate and sodium chloride solutions into a well-stirred reactor containing glutaryldiaminophenyldisulfide, gelatin peptizer, and thioether ripener. Cesium pentachloronitrosylosmate(II) dopant is added during the silver halide grain formation for most of the precipitation, followed by the addition of potassium hexacyanoruthenate(II), potassium (5-methyl-thiazole)-pentachloroiridate, a small amount of KI solution, and shelling without any dopant. The resultant emulsion contains cubic-shaped grains having edge length of 0.6 μm. The emulsion is optimally sensitized by the addition of a colloidal suspension of aurous sulfide and heat ramped to 60° C., during which time blue sensitizing dye BSD-4, potassium hexchloroiridate, Lippmann bromide, and 1-(3-acetamidophenyl)-5-mercaptotetrazole were added.

Green Sensitive Emulsion (Green EM-1)

A high chloride silver halide emulsion is precipitated by adding approximately equimolar silver nitrate and sodium chloride solutions into a well-stirred reactor containing gelatin peptizer and thioether ripener. Cesium pentachloronitrosylosmate(II) dopant is added during the silver halide grain formation for most of the precipitation, followed by the addition of potassium (5-methylthiazole)-pentachloroiridate. The resultant emulsion contains cubic-shaped grains of 0.3 μm in edge length size. The emulsion is optimally sensitized by the addition of glutaryldiaminophenyldisulfide, a colloidal suspension of aurous sulfide and heat ramped to 55° C., during which time potassium hexachloroiridate doped Lippmann bromide, a liquid crystalline suspension of green sensitizing dye GSD-1, and 1-(3-acetamidophenyl)-5-mercaptotetrazole were added.

Red Sensitive Emulsion (Red EM-1)

A high chloride silver halide emulsion is precipitated by adding approximately equimolar silver nitrate and sodium chloride solutions into a well-stirred reactor containing gelatin peptizer and thioether ripener. During the silver halide grain formation, potassium hexacyanoruthenate(II) and potassium (5-methylthiazole)-pentachloroiridate are added. The resultant emulsion contains cubic shaped grains of 0.4 μm in edge length size. The emulsion is optimally sensitized by the addition of glutaryldiaminophenyldisulfide, sodium thiosulfate, tripotassium bis{2-[3-(2-sulfobenzamido)phenyl]-mercaptotetrazole} gold(I) and heat ramped to 64° C., during which time 1-(3-acetamidophenyl)-5-mercaptotetrazole, potassium hexachloroiridate, and potassium bromide are added. The emulsion is then cooled to 40° C., pH adjusted to 6.0, and red sensitizing dye RSD-1 is added.

Coupler dispersions were emulsified by methods well known to the art, and the following layers were coated on the following support: The following flesh tone optimized light sensitive silver halide imaging layers were utilized to prepare photographic label utilizing the invention label base material. The following imaging layers were coated utilizing curtain coating. The gelatin containing layers were hardened with bis(vinylsulfonyl methyl) ether at 1.95% of the total gelatin weight.

TABLE 1

| Layer | Item | Laydown ($g/m^2$) |
|---|---|---|
| Layer 1 | Blue Sensitive Layer | |
| | Gelatin | 1.3127 |
| | Blue sensitive silver (Blue EM-1) | 0.2399 |
| | Y-4 | 0.4143 |
| | ST-23 | 0.4842 |
| | Tributyl Citrate | 0.2179 |
| | ST-24 | 0.1211 |
| | ST-16 | 0.0095 |
| | Sodium Phenylmercaptotetrazole | 0.0001 |
| | Piperidino hexose reductone | 0.0024 |
| | 5-chloro-2-methyl-4-isothiazolin-3-one/2-methyl-4-isothiazolin-3-one(3/1) | 0.0002 |
| | SF-1 | 0.0366 |
| | Potassium chloride | 0.0204 |

TABLE 1-continued

| Layer | Item | Laydown (g/m$^2$) |
|---|---|---|
| | Dye-1 | 0.0148 |
| Layer 2 | Interlayer | |
| | Gelatin | 0.7532 |
| | ST-4 | 0.1076 |
| | S-3 | 0.1969 |
| | 5-chloro-2-methyl-4-isothiazolin-3-one/2-methyl-4-isothiazolin-3-one(3/1) | 0.0001 |
| | Catechol disulfonate | 0.0323 |
| | SF-1 | 0.0081 |
| Layer 3 | Green Sensitive Layer | |
| | Gelatin | 1.1944 |
| | Green sensitive silver (Green EM-1) | 0.1011 |
| | M-4 | 0.2077 |
| | Oleyl Alcohol | 0.2174 |
| | S-3 | 0.1119 |
| | ST-21 | 0.0398 |
| | ST-22 | 0.2841 |
| | Dye-2 | 0.0073 |
| | 5-chloro-2-methyl-4-isothiazolin-3-one/2-methyl-4-isothiazolin-3-one(3/1) | 0.0001 |
| | SF-1 | 0.0236 |
| | Potassium chloride | 0.0204 |
| | Sodium Phenylmercaptotetrazole | 0.0007 |
| Layer 4 | M/C Interlayer | |
| | Gelatin | 0.7532 |
| | ST-4 | 0.1076 |
| | S-3 | 0.1969 |
| | Acrylamide/t-Butylacrylamide sulfonate copolymer | 0.0541 |
| | Bis-vinylsulfonylmethane | 0.1390 |
| | 3,5-Dinitrobenzoic acid | 0.0001 |
| | Citric acid | 0.0007 |
| | Catechol disulfonate | 0.0323 |
| | 5-chloro-2-methyl-4-isothiazolin-3-one/2-methyl-4-isothiazolin-3-one(3/1) | 0.0001 |
| Layer 5 | Red Sensitive Layer | |
| | Gelatin | 1.3558 |
| | Red Sensitive silver (Red EM-1) | 0.1883 |
| | IC-35 | 0.2324 |
| | IC-36 | 0.0258 |
| | UV-2 | 0.3551 |
| | Dibutyl sebacate | 0.4358 |
| | S-6 | 0.1453 |
| | Dye-3 | 0.0229 |
| | Potassium p-toluenethiosulfonate | 0.0026 |
| | 5-chloro-2-methyl-4-isothiazolin-3-one/2-methyl-4-isothiazolin-3-one(3/1) | 0.0001 |
| | Sodium Phenylmercaptotetrazole | 0.0005 |
| | SF-1 | 0.0524 |
| Layer 6 | UV Overcoat | |
| | Gelatin | 0.8231 |
| | UV-1 | 0.0355 |
| | UV-2 | 0.2034 |
| | ST-4 | 0.0655 |
| | SF-1 | 0.0125 |
| | S-6 | 0.0797 |
| | 5-chloro-2-methyl-4-isothiazolin-3-one/2-methyl-4-isothiazolin-3-one(3/1) | 0.0001 |
| Layer 7 | SOC | |
| | Gelatin | 0.6456 |
| | Ludox AM ™ (colloidal silica) | 0.1614 |
| | Polydimethylsiloxane (DC200 ™) | 0.0202 |
| | 5-chloro-2-methyl-4-isothiazolin-3-one/2-methyl-4-isothiazolin-3-one(3/1) | 0.0001 |
| | SF-2 | 0.0032 |
| | Tergitol 15-S-5 ™ (surfactant) | 0.0020 |
| | SF-1 | 0.0081 |
| | Aerosol OT ™ (surfactant) | 0.0029 |

The rolls of light sensitive silver halide emulsion coated on the label support of this example were printed using a digital CRT photographic printer. Several test images that contained graphics, text, and images were printed on the photographic packaging label material. The printed images were then developed using standard reflective photographic RA 4 wet chemistry. At this point, the image was formed on a thin label support. The environmental protection layer and primer layer utilized in the invention were applied using extrusion hopper coating from a coating solution at 13 weight percent solids over the topmost gelatin layer of the imaging layers.

The structure of the imaged, protected silver halide pressure sensitive packaging label was as follows:

Environmental protection layer

Primer layer

Developed silver halide imaging layers (yellow, magenta and cyan)

Voided polypropylene base

Acrylic pressure sensitive adhesive

Polyester liner

Label Test

Water Test

To test the barrier properties of the protection overcoat to water a drop of water was placed on the coating and allowed to stay for 10 minutes after which it was shaken off. The presence or absence of swell was visually observed and followed by wiping the area with a tissue to check for any stickiness of the surface.

Adhesion Test

The surface of the coating was lightly scored with a sharp razor blade to create a cross-hatch like pattern consisting of at least of 5 blocks. To test for adhesion of the coating to the underlying gelatin layer a piece of Scotch tape was tightly pressed over the cross-hatched area and pulled at an approximately 180 degree angle and examined for removal of the coating. The coating was given a rating of 0–5 with a 0 indicating no removal, 0–1 some on the edges of the blocks, 1 a full block and so on. A rating of 5 indicates a removal of >3 squares.

Friction Test

EXAMPLES 1–6

The radiation curable compositions listed in Table 1 were coated as the environmental protection layer over a terpolymer vinylidene chloride/methyl acrylate/itaconic acid primer layer (at a coat weight of 0.54 g/m$^2$) bearing silver halide imaged and processed label stock using a number 1 wire-wound Meyer rod and cured by passing it at 150 feet a minute under a 6 inch Fusion UV H+ bulb. The dry coverage of the cured coating was 2.46 g/m$^2$. The coated samples and a control sample that had not been coated with the environmental protection layer were subject to the water test. In all cases the protective overcoat provided excellent barrier to water compared to the control which swelled and smeared when wiped wet.

TABLE 2

| EXAMPLE | UV SYSTEM | RESISTANCE TO WATER |
|---|---|---|
| 1 (Control) | NONE | Poor |
| 2 (Invention) | RD 1020 (acrylic) | Excellent |
| 3 (Invention) | RD 1200 (acrylic) | Excellent |
| 4 (Invention) | Radcure 504W (acrylic) | Excellent |
| 5 (Invention) | Imagegard FP-3 (epoxy) | Excellent |
| 6 (Invention) | L533-199 | Excellent |

EXAMPLES 7–12

The use of a primer layer to improve adhesion of the UV cured environmental protection layer to the gelatin layer below is shown in these examples. A primer was first applied to the silver halide imaged and processed label stock by coating the terpolymer vinylidene chloride/methyl acrylate/itaconic acid so that a coat weight of 0.54 g/m2 was obtained. The radiation curable compositions listed in Table 3 were coated as the environmental protection layer over the primer coated label stock a using a number 1 wire-wound Meyer rod and cured by passing it at 150 feet a minute under a 6 inch Fusion UV H+ bulb. The dry coverage of the cured coating was 2.46 g/m$^2$. As Table 3 shows, in the case of L533-119 the coating exhibited no adhesive failure when coated over the primer whereas it delaminated from the gelatin surface in the absence of the primer. Further, in cases where the UV cureable monomers had difficulty wetting the surface of hydrophilic gelatin, wettability was greatly improved when coated over the primer layer.

TABLE 3

| EXAMPLE | UV SYSTEM | PRIMER | ADHESION (Failure) | WETTA-BILITY |
|---|---|---|---|---|
| 7 | L533-119 | None | 5 | Poor |
| 8 | L533-119 | | 0 | Excellent |
| 9 | RD1220 (acrylic) | None | 5 | Poor |
| 10 | RD1220 (acrylic) | | 0 | Excellent |
| 11 | RD707 (acrylic) | None | 5 | Poor |
| 12 | RD707 (acrylic) | | 0 | Excellent |

EXAMPLES 13–15

The use of a wax to lower the face-to-face friction of the environmental protection coatings are shown in examples 13–15. Imagegard FP-3 was coated as the environmental protection layer over a silver halide imaged and processed label stock using a number 1 wire-wound Meyer rod and cured by passing it at 150 feet a minute under a 6 inch Fusion UV H+ bulb. The dry coverage of the cured coating was 2.46 g/m$^2$. Three similar coating were made but contained a percent each of beeswax (BW), camauba wax (CW) and a silicone fluid (SF) DC 200 from Dow Coming respectively with respect to the UV cured polymer. Face-to-face friction was measured for each of the samples. As Table 4 shows, the waxes showed remarkable improvement in reducing the face-to-face stickiness compared to the controls which included a silicone fluid.

TABLE 4

| EXAMPLE | UV SYSTEM | Breakaway Avg | Kinetic Avg |
|---|---|---|---|
| 13 | Imagegard FP-3 | Blocked | |
| 14 | Imagegard FP-3 + SF | Blocked | |
| 15 | Imagegard FP-3 + CW | 0.12 | 0.17 |
| 16 | Imagegard FP-3 + BW | 0.14 | 0.22 |

Appendix - Compounds Used in Examples

-continued

BSD-4

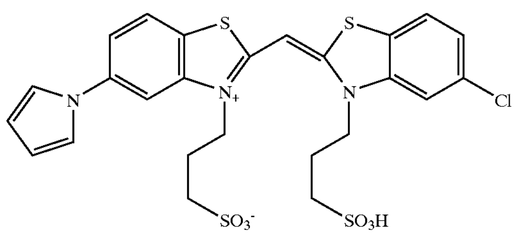

GSD-1

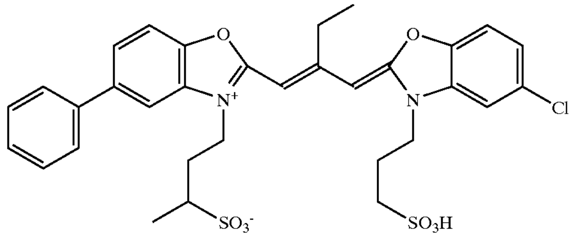

RSD-1

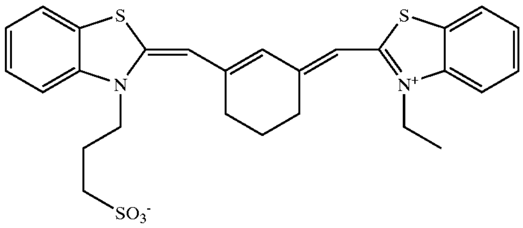

Y-4

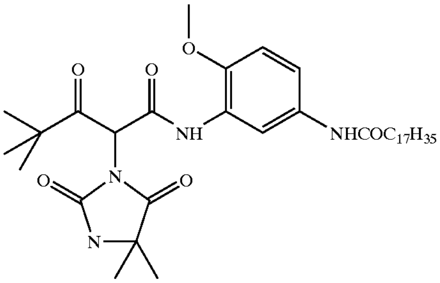

ST-23

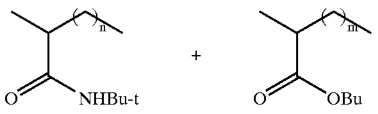

ST-24

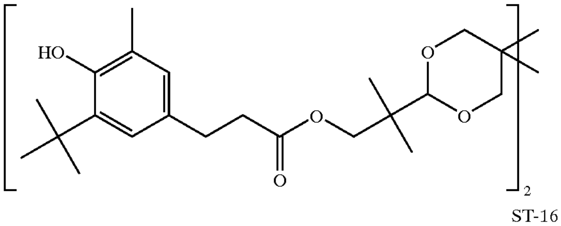

ST-16

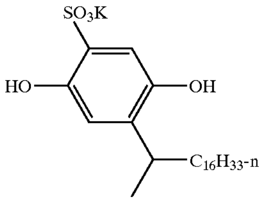

-continued
SF-1
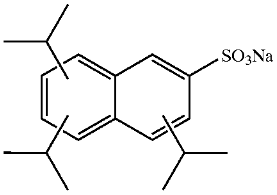
Dye-1
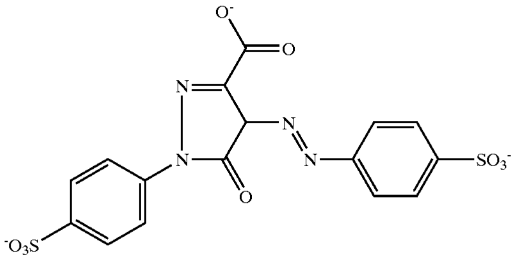
ST-4
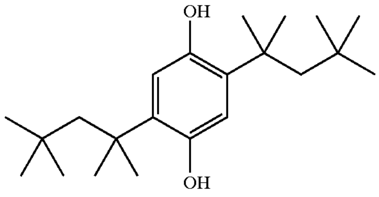
S-3
Diundecyl phthalate
M-4
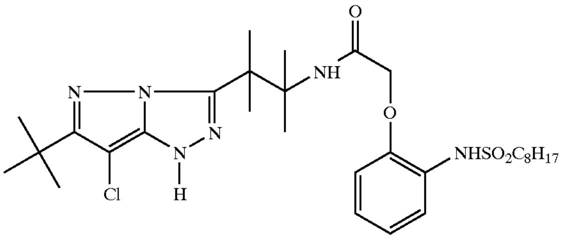
ST-21
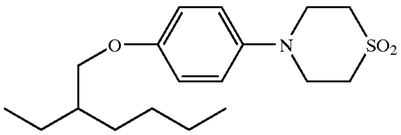
ST-22
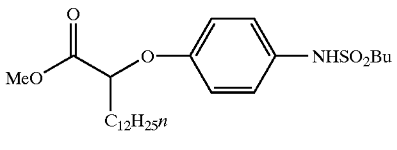
Dye-2
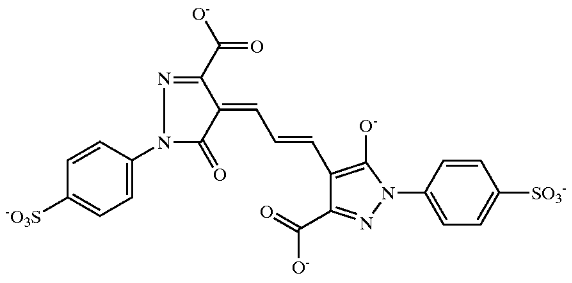
-continued
IC-35
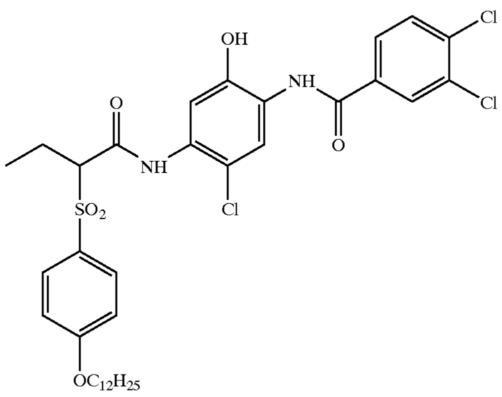
IC-36
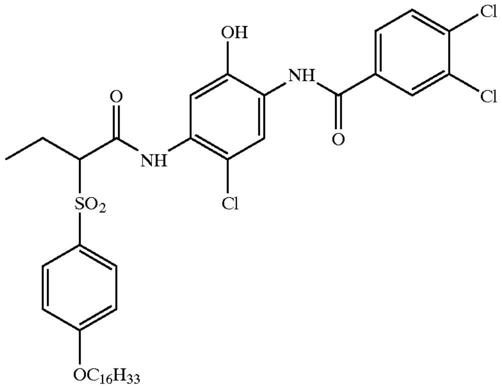
S-6
Tris(2-ethylhexyl)phosphate
Dye-3
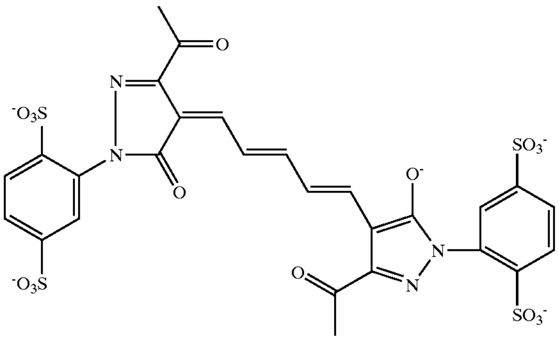
UV-1
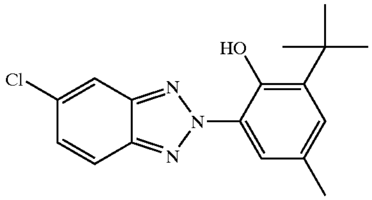

-continued

UV-2

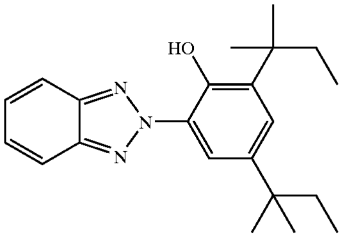

The invention has been described in detail with particular reference to certain preferred embodiments thereof, but it will be understood that variations and modifications can be effected within the spirit and scope of the invention.

What is claimed is:

1. A packaging material comprising in order a ultraviolet radiation cured environmental protection layer, a primer layer, a hydrophilic image layer, a base and an adhesive layer.

2. The packaging material of claim 1 wherein said hydrophilic image layer comprises an image formed utilizing of silver halide.

3. The packaging material of claim 1 wherein said hydrophilic image layer comprises an image formed by means of ink jet printing.

4. The packaging material of claim 1 wherein said hydrophilic image layer comprises an image formed by means of electrophotography.

5. The packaging material of claim 1 wherein said primer layer comprises an acrylic latex copolymer.

6. The packaging material of claim 1 wherein said primer layer comprises vinylidene chloride.

7. The packaging material of claim 1 wherein primer layer has a dry coverage of greater than 0.27 $g/m^2$.

8. The packaging material of claim 1 wherein said environmental protection layer comprises acrylate polymer.

9. The packaging material of claim 1 wherein said environmental protection layer has a Rockwell R hardness of greater than 90.

10. The packaging material of claim 1 further comprising a lubricant on the side of said environment protection layer opposite said primer layer.

11. The packaging material of claim 10 wherein said lubricant comprises wax.

12. The packaging material of claim 10 wherein said lubricant has a coefficient of friction against itself of less than 0.5.

13. The packaging material of claim 10 wherein said lubricant has a coefficient of friction against itself of between 0.3 and 0.05.

* * * * *